US006785907B1

(12) United States Patent
Dan et al.

(10) Patent No.: US 6,785,907 B1
(45) Date of Patent: Aug. 31, 2004

(54) AMPLIFIER AND EQUALIZER FOR TWO WAY CABLE TRANSMISSION

(75) Inventors: Viorel nil Dan, Toronto (CA); Anthony J. Sandaluk, Toronto (CA)

(73) Assignee: Cableserv Electronics, LTD, Ontario (CA)

( * ) Notice: Subject to any disclaimer, the term of this patent is extended or adjusted under 35 U.S.C. 154(b) by 0 days.

(21) Appl. No.: 09/426,624

(22) Filed: Oct. 26, 1999

Related U.S. Application Data

(63) Continuation-in-part of application No. 09/134,514, filed on Aug. 14, 1998, now Pat. No. 5,990,929.

(51) Int. Cl.[7] .............................................. H04N 7/173
(52) U.S. Cl. ....................... 725/128; 725/127; 725/149; 330/302; 330/304
(58) Field of Search .............................. 725/127, 128; 330/302–305

(56) References Cited

U.S. PATENT DOCUMENTS

| | | | | |
|---|---|---|---|---|
| 5,193,213 A | * | 3/1993 | Chon | 455/45 |
| 5,280,346 A | * | 1/1994 | Ross | 348/602 |
| 5,738,525 A | * | 4/1998 | Davies | 434/219 |
| 5,745,838 A | * | 4/1998 | Tresness et al. | 725/128 |
| 5,835,844 A | * | 11/1998 | Stoneback et al. | 455/5.1 |
| 5,990,929 A | * | 11/1999 | Sandaluk | 725/127 |
| H1879 H | * | 10/2000 | Spriester | 348/12 |
| 6,321,384 B1 | * | 11/2001 | Eldering | 725/125 |
| 6,345,390 B1 | * | 2/2002 | Eto et al. | 725/127 |
| 6,598,232 B1 | * | 7/2003 | McAlear | 725/126 |

* cited by examiner

*Primary Examiner*—Vivek Srivastava
*Assistant Examiner*—Reuben Brown
(74) *Attorney, Agent, or Firm*—Ohlandt, Greeley, Ruggiero & Perle

(57) ABSTRACT

A feed signal equalizer for a feed amplifier for two-way coaxial cable systems, of the type having a distribution centre distributing feed signals, and having reception facilities for receiving return signals from said cable system, the system having feed amplifiers for receiving feed signals, and having return amplifiers, and the feed signal equalizers are settable to provide varying amplifier specifications, and having receptacles for receiving plug-in equalizer components for varying the specifications of the feed amplifier, the equalizer components having a range of varying performance characteristics so that a component can be selected and plugged in to the feed signal equalizer to produce the performance specifications desired at a predetermined location in the cable system.

6 Claims, 6 Drawing Sheets

AMPLIFIER AND EQUALIZER FOR TWO WAY CABLE TRANSMISSION

This application is a Continuation-In-Part of U.S. application Ser. No. 09/134,514 Filed: Aug. 14, 1998 now U.S. Pat. No. 5,990,929.

FIELD OF THE INVENTION

The invention relates to amplifiers for use on a coaxial cable transmission system, for amplifying both the feed signals and the return signals carried on such system, and to such an amplifier having plug in equalizer and attenuator components for presetting the performance characteristics of the amplifier to a particular location on the cable system and for a predetermined frequency band.

BACKGROUND OF THE INVENTION

It is well known practice to transmit signals in two directions, along a common electrical wire transmitting system, a typical example being a telephone system. Telephone wire transmission systems are well known for transmitting voice transmissions and also for transmitting electronically generated signals from a wide variety of equipment such as security systems, facsimile machines, and a wide variety of computer information for example, coded signals concerning credit transactions, and transferring information to and from computers connected to the telephone wire system. Due to the nature of the telephone wire transmission systems, there are significant restrictions on the speed, and volume, of information which can be transmitted within a given time span. In the past this has not been a significant problem. However, with the ever increasing popularity of the so called "Internet", the ability to transmit very large volumes of information at high speed in both directions has become critical. The telephone wire transmission system does not readily accommodate itself to the very substantial expansion of the volume of information as well as the increase in speed of transmission that is required to satisfy the growing number of customers requiring Internet services. As a result, Internet servicing companies are seeking alternative means of transmission. Other communication may require the sending of reverse signals along the cable, such signals including eg. metering box and telephone signals.

Telephone wire transmission systems are also subject to intermittent interference from a variety of sources, and are sometimes simply so overloaded that they are incapable of accepting further transmissions.

Coaxial cable transmission networks for distributing cable television services are becoming widely accepted in many cities and towns, and provide excellent services for distributing television signals to television sets of subscribers on the network. Such cable television distribution systems are based on a coaxial wire cable, having a single central conductive core, and a woven sheath of wire or other form of conductive sheath, insulated from the core. Such coaxial cable is capable of transmitting much greater volumes of information at high speed, and with very little interference. In the past such cable systems have been used for one way transmission of television signals from the head end signal source to the consumers television sets. Feed amplifiers are provided at intervals to maintain signal strength, which would otherwise become attenuated, due to the length of the cable system. Such feed amplifiers incorporate equalizers and attenuators for equalizing the signals across the frequency band of the signals.

The existence of wide spread cable television signal networks has lead to the development of their use as a means of connecting consumers to the Internet system. The coaxial cable systems, with feed signal amplifiers located along the cables at spaced intervals, and with their substantial freedom from interference, lend themselves particularly well to the rapid transmission of high volume signals such as are generated by the Internet system. Consequently consumers are increasingly looking to the coaxial cable television networks as a means of connecting their computers to the Internet, so as to avoid the difficulties of connections via the telephone wire systems.

One of the problems encountered in using coaxial cable networks for distribution of Internet signals is that Internet signals travel in two directions, both to and from the consumer. This is unlike television signals, which travel in the feed direction, from the supplier to the consumer. To carry Internet signals, the coaxial cables are required to carry signals in both directions simultaneously. The consumer will be receiving signals from an Internet service provider (ISP), and will be generating return signals, generated from his or her computer, back onto to the Internet. In theory the coaxial cable networks are ideally suited to this type of two-way transmission. In practice however, there are problems which arise from the original design of such cable systems. Since the coaxial cable networks are relatively long, the feed signals on the networks gradually become attenuated and decrease in strength as they pass along the length of the cable. In the case of television feed signals this problem is overcome, as mentioned above, by the use of feed signal amplifiers located in the coaxial cables at spaced intervals. These feed signal amplifiers ensure that all subscribers on any particular cable network will receive signals of adequate strength, so that in spite of the considerable length of any one particular cable, the feed signals will all be substantially of the same signal strength to all households on that cable network.

Such feed signal amplifiers are capable only of amplifying the feed signals fed into the coaxial cable from the head end and equalizing them across the frequency band but cannot amplify return signals, passing in the opposite direction.

When it is attempted to adapt the coaxial cable system for two-way transmission of Internet signals, the return Internet signals are unable to pass through the feed amplifiers already incorporated in the coaxial network. Return signal amplifiers have been used to amplify the return Internet signals. These return signal amplifiers are located alongside the feed amplifiers on the coaxial cable network and pass the return Internet signals around the feed amplifiers, and increase the return Internet signal strength. In this way, the return signals bypass the feed amplifiers, and at the same time their signal strength is maintained at the desired level so that it can be fed back to the Internet server. Other communication may require the sending of reverse signals along the cable, such signals including eg. metering box and telephone signals.

The problem of signal strength is aggravated by the attenuation of signal strength. Attenuation varies, and is greater in the higher range of frequencies, and is lower in the lower range of frequencies. The feed amplifiers in use on cable systems are already designed to overcome these problems, and equalise the signal strength over the entire frequency band of the feed television signals. However, the adaptation of an existing cable network to accept two-way transmission of signals such as Internet signals, requires both that the return amplifiers with suitable equalizers be installed on the already existing cable network, and further that the existing feed amplifiers shall be modified so as to equalize all signals, both television and Internet, travelling in the feed directions.

Feed amplifiers for maintaining signal strength of the feed signals should be modified so as to amplify both the Internet and television signals over the entire frequency range of the signals and to equalize these signals back up to a uniform level of signal strength, across the entire range of frequency of both Internet and television signals. However, the signal strength of the signals at any given location on an existing cable network can only be determined by actually measuring the signals at that location. This signal strength will vary from one location to another. At present, the feed amplifiers are produced as a standard item, however, several such feed amplifiers are re . . . which have performance characteristics which vary from one cable location to another.

Typically, the Internet feed signals are placed within this frequency range of from about 50 to 860 megahertz, ie the usual bandwith of television signals. Certain other feed signals may also be included in the range. If the amplification of the signals does not produce a uniform signal strength over this entire range then the signals will be distorted.

The design and construction of feed signal amplifiers for cable systems is dependent upon the fact that the feed amplifiers are positioned at spaced locations along any given length of coaxial cable in the system and are located at an elevation upon a cable post, in most cases. Amplifiers with standard characteristics will not be equally suitable at each location. In fact, it will be found that before an amplifier is installed by the installer, the signal strength at that location in the cable must be tested and an amplifier must be installed having the correct amplifying and equalizing characteristics for that particular location in the coaxial cable network. These specifications will vary from one amplifier location to another along any given length of the coaxial cable.

In theory it is perfectly possible to manufacture a whole range of amplifiers having a range of different equalization characteristics. A coaxial line crew could carry a large supply of such amplifiers with them, and after testing and checking the signal strength at a particular location, could then select and insert the appropriate amplifier having the correct specifications for that location. In practice however this is not possible, since it will require a very large investment for supplying an adequate inventory of amplifiers covering a full range of characteristics, to each particular line crew. In addition, transporting such a large inventory of amplifiers covering a wide range of different characteristics, presents a problem of transporting a large number of bulky and relatively heavy objects.

A further problem is the fact that the line crew person will be required to climb up the post to reach the coaxial cable. Then the line person must check the signal strength and then come down and select the appropriate amplifier and then climb back up again and insert it. This is a slow and tiresome job.

For all of these reasons, providing an adequate number of amplifiers having ranges of different characteristics to meet all conditions and requirements on a given coaxial cable network becomes a logistical nightmare, and a severe financial strain, and causes much undesirable additional labour.

The cable networks carrying television signals are already in existence and the feed amplifiers are already in place on posts on those cables. However, as conditions change and as frequency band changes in amplification may be required.

Adapting the entire cable network by replacing all of the feed amplifiers with new feed amplifiers having modified characteristics both as to amplification and the equalization, is simply not practical.

For all of these reasons, therefore, it is desirable to provide a standardized equalizer circuit and having a plurality of plug-in components, which can simply be carried in the personal equipment of the lines person. These standardized equalizer circuits can then simply be inserted in the existing feed amplifiers by removing the existing equalizer circuits in the existing feed amplifiers, and installing the new standardized equalizer circuits. By the use of the plurality of plug-in components, each equalizer circuit after it is installed, can then be adjusted to the appropriate equalizer characteristics required for that particular location along the cable network.

Thus, after climbing up to the cable, the lines person can simply install a standardized equalizer in the feed amplifier, in place of the existing equalizer and then test the signal strength and characteristics and then insert the appropriate plug-in components to produce an equalizer having the necessary characteristics for that particular location in the system.

A lines person will be required to carry only one set of plug in components, in an adequate range of performance characteristics, so that when the signal strength has been measured at that location, the equalizer can readily be set to the correct performance, by simply selecting the plug in components having the correct values.

This greatly reduces the requirement for carrying a large inventory of amplifiers and greatly reduces the financial burden of carrying such an inventory and also reduces the logistical problems and the time consuming effort by the lines crew of checking signal strength.

BRIEF SUMMARY OF THE INVENTION

With a view to achieving improvements in amplifiers for two-way coaxial cable lines, of the type having a transmission centre, and a plurality of coaxial cable lines extending therefrom, and a plurality of tap ports connecting signals from the coaxial cable line to respective terminals, and said coaxial cable system having a signal distribution system having facilities for distributing feeder signals onto said cable system and reception facilities for receiving return signals from said cable system, and wherein feeder signals and return signals passing along said cable system in opposite directions are progressively attenuated in signal strength, said system having feeder amplifiers at spaced intervals there along, for receiving feed signals passing along said coaxial cables, and amplifying the same, the invention provides a standardized signal equalizer circuit for installation in the feed amplifiers having a standard equalization circuits, which are settable to provide varying equalization specifications, and having receptacles for receiving plug in circuit components for varying said equalization specifications, and a plurality of plug in circuit components, each being adapted to interfit with said standardized equalizer circuit, and said components having a range of varying performance characteristics whereby a respective said component can be selected and plugged in to a said equalizer circuit to produce the performance specifications desired at a predetermined location.

The invention further contemplates the provision of return signal amplifiers having signal equalizers and wherein the feed signal equalizer and the return amplifier shall incorporate a circuit adapted to receive one of a group of plug in attenuator components, wherein the plug in attenuator components for the feed equaliser circuit, and for the return amplifier and equalizer shall be interchangeable between the two circuits.

In this way, a lines person can, at one time, both install a return amplifier, and a feed amplifier equalizer, and can set both feed and return equalizers to the characteristics required for that location.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 1A shows a portion of one dwelling greatly enlarged and cut away for the purposes of explanation and clarity;

Figure 4:
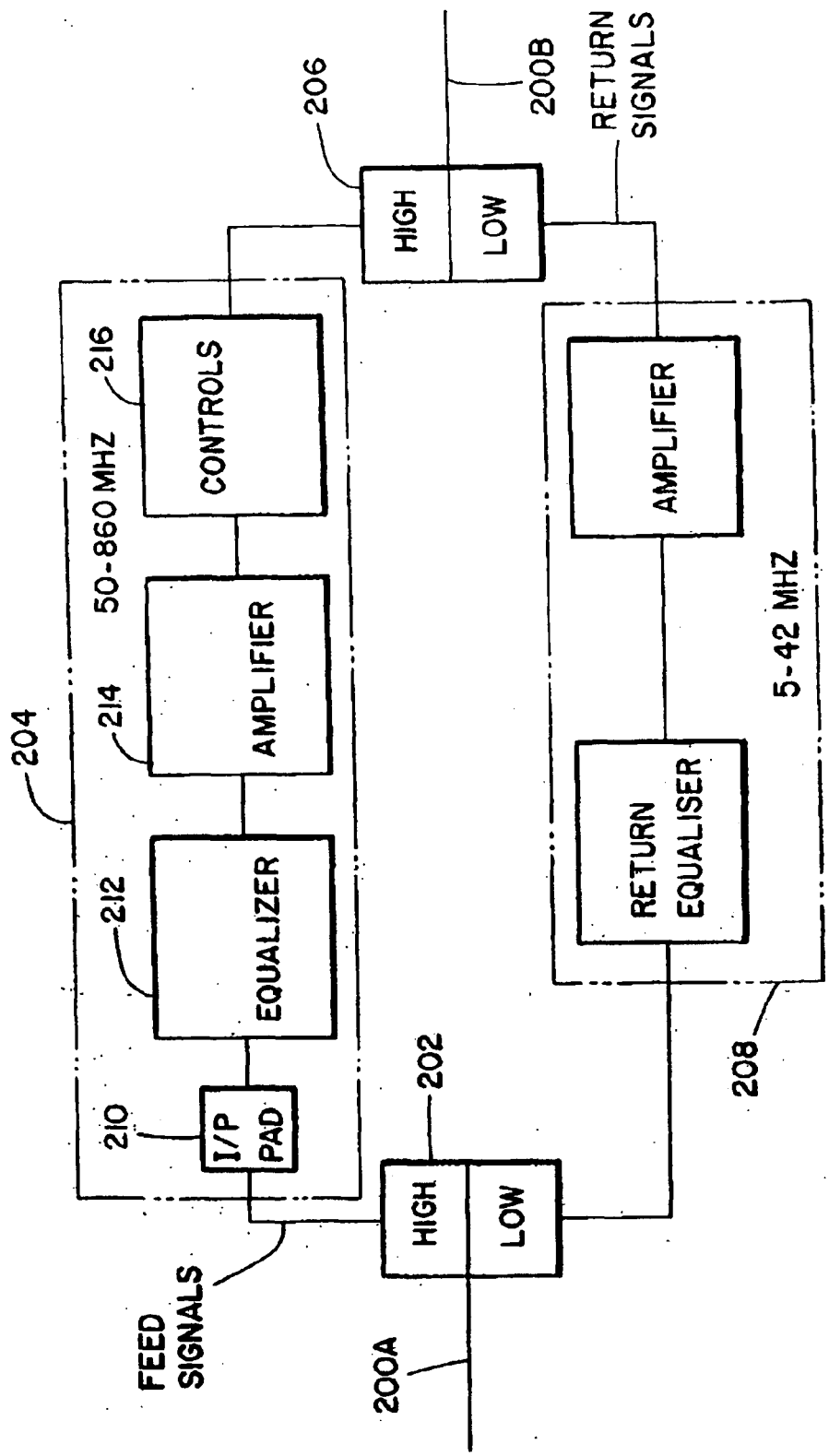
Figure 5:
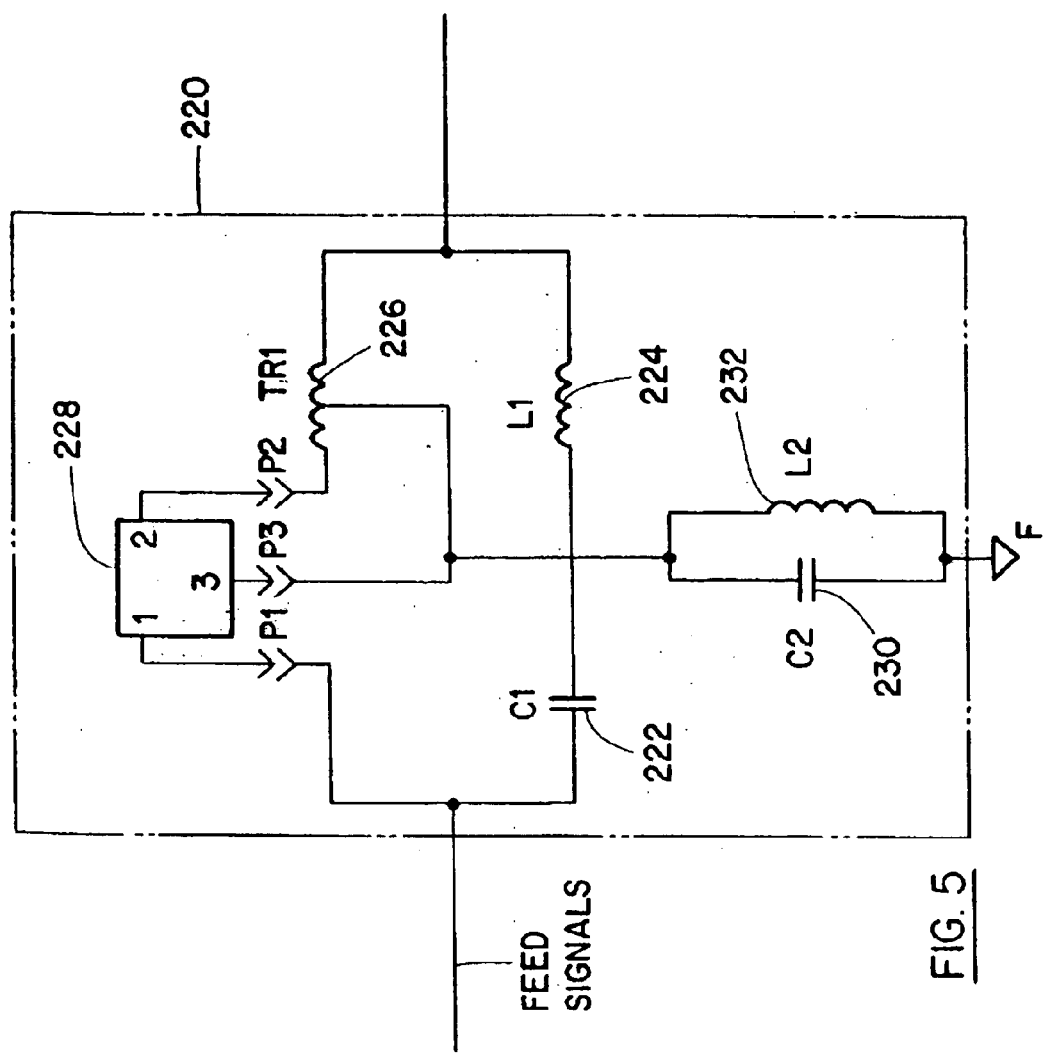

FIG. 4 is a schematic block diagram of a typical feeder amplifier, and feeder equalizer, as installed in an existing cable network, and showing the return amplifier in accordance with the invention in position; and FIG. 5 is a schematic block diagram showing the feeder equalizer in accordance with the invention, shown coupled to the existing feed amplifier, replacing the pre-existing feed equalizer.

Figure 6:
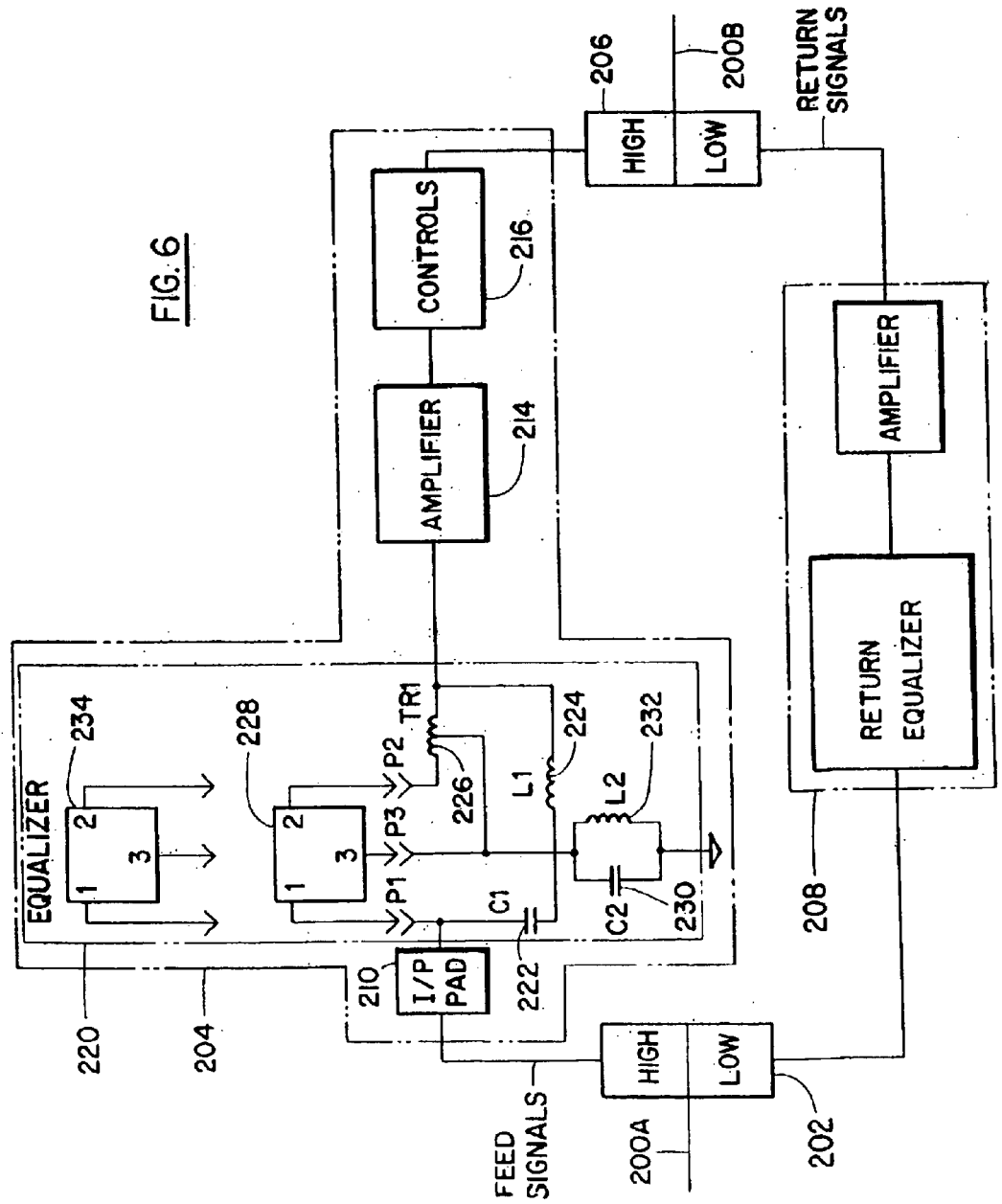

FIG. 6 is a circuit block diagram of a cable transmission network with an equalizer having a series of different plug in attenuator components of the present invention being connected in a feed amplifier assembly and the cable transmission network further having a return amplifier assembly.

DESCRIPTION OF A SPECIFIC EMBODIMENT

Figure 1:
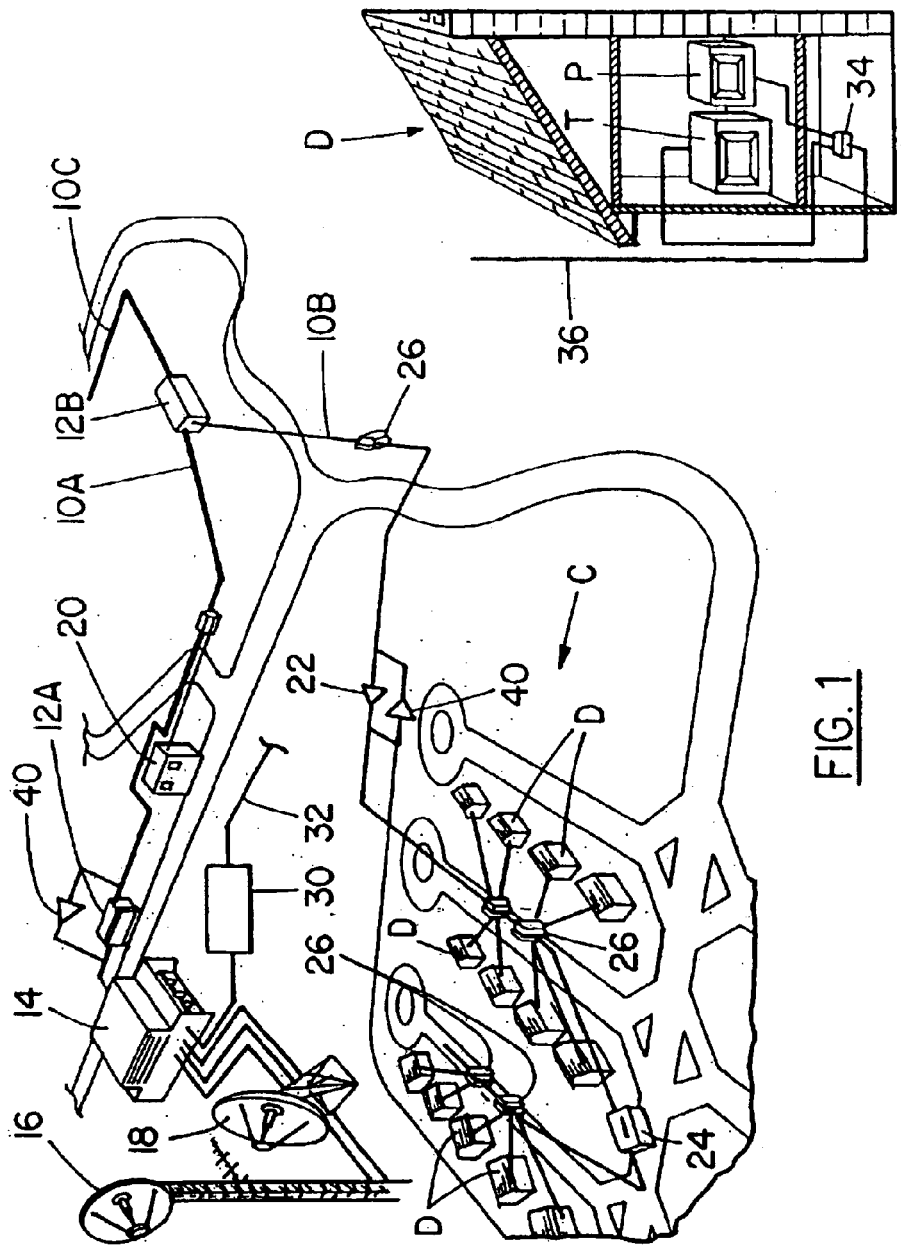
FIG. 1 is a schematic perspective illustration of a portion of a community coaxial cable signal distribution system.

Referring first of all to FIG. 1, it will be seen that what is represented there is a community indicated generally as C, consisting of a plurality of dwellings indicated as D, and one of the dwellings indicated as D being greatly enlarged and partially cut away.

Within the cut away enlarged dwelling D it will be seen that the dwelling is provided with a television receiver indicated as T, and a typical personal computer indicated as P.

It will of course be appreciated that the dwellings, television and personal computer do not form any part of the invention, and are merely represented schematically for the sake of explaining the utility of the invention.

A coaxial cable distribution line is indicated generally as 10A. It is supplied through a main station 12A, from a head end supply installation 14 with first feed signals, in this case television signals. Further main stations 12B and so on may be located at spaced intervals along the cable 10A, allowing branch cables indicated for example as 10B and 10C to be connected to the main cable 10A.

The head end installation 14 in this particular case is shown supplied with VHF signals through a VHF microwave antenna 16. A television satellite antenna 18 may also be connected to the head end 14. Typically the microwave antenna 16 will be arranged and focussed on a microwave transmitter at a distance across country, and will receive focussed television signals from the microwave transmitter station (not shown) the details of such systems being well-known by persons skilled in the art.

The satellite antenna 18 will similarly be focussed a television transmission satellite, such as is well-known in the art, located in fixed orbit above the earth, so that television signals may be received at the satellite antenna 18 from such a satellite (not shown). All of such signals may be processed in the head end installation 14, and distributed along the cable system 10A, 10B, 10C and so on throughout the community.

In accordance with well-known practice, the cable system 10A, 10B and 10C is provided with a power supply indicated generally as 20, to supply power to the cable system.

At various locations along the cable system there will be located feeder amplifiers indicated generally as 22. The feeder amplifiers 22 amplify the feed signal in such a manner as to amplify and equalize the levels of the various frequencies, so that all of the consumers indicated by the dwellings D will receive the signals of adequate signal strength and which signals are substantially equalized across the bandwidth of the feeder signal. Optionally one or more line extenders 24 may be included which essentially provide the same function as the feeder amplifiers 22.

In this way, the level of the feed signal over the entire network of coaxial cables 10A, 10B, 10C and so on is substantially equalized to a stable level, across the entire frequency band being distributed, so as to ensure that every subscriber receives a satisfactory adequate signal.

Up to this point, what has been described is essentially a standard state of the art cable television distribution network, in which television feed signals are simply received and processed at a head end 14 and are distributed as feed signals down the coaxial cable system to the various subscribers indicated in this case as D.

It will of course be appreciated that the subscribers are not necessarily represented as dwellings, but may be any number of different types of outlets or institutions that may be connected by cable.

At various locations along the cable system there are located subscriber cable connections known as tap ports indicated generally as 26. There may be one tap port for each subscriber or there may be a plurality of subscribers connected to a single tap port, depending upon the design of the system, all of which is well-known in the art.

In addition however to distributing television signals, the cable system as illustrated is also used for distributing two-way signals. The two-way signals consist in this case of second feed signals supplied from an Internet server indicated generally as 30, and return signals generated by individual subscribers. The Internet server 30 is connected by any suitable Internet connecting line indicated as 32.

As explained above, the coaxial cable system is capable of carrying on other non-television Internet signals which are at frequencies separated from the frequency ranges of various television channels, and the coaxial cable system is also capable of carrying return Internet signals, which will consist of signals developed by individual Internet subscribers in their own personal computers. The Internet system connected to individual subscribers having personal computers is itself well-known, and as mentioned above, is usually connected through telephone cable systems to individual dwellings or subscribers at various locations or in businesses. Other signals may be sent in the same manner.

Also as mentioned above, the use of the coaxial cable television network as a means for handling both feed and return Internet signals has numerous advantages as compared with using the telephone wire distribution system.

Once the Internet servers signals are connected to the head end installation 14, they are distributed as second feed signals down the coaxial cable system 10A, 10B and 10C, and can be received by subscribers having appropriate equipment. Thus in the cut away dwelling D, a signal splitter 34 is shown receiving signals from the coaxial cable system, and distributing them to the television T on the one hand and to the personal computer P on the other hand.

The splitter 34 will operate so as to separate the television frequency signals on the coaxial cable system, from the Internet signals on the coaxial cable system. Each dwelling is connected from a tap port 26, by means of a connector cable 36.

It will of course be understood that not all of the dwellings D will be provided with a splitter 34, since not all of the dwellings D will in fact be customers of the Internet server 30.

In the case of those dwellings D which are not customers of the Internet server 30, then the cable connector 36 will feed directly into the television set. Alternatively, it may feed through a conventional television cable splitter (not shown) into two or more television sets in the same dwelling in a well known manner.

As has already been explained, the Internet system involves the use of two-way signals, so that the Internet server will feed Internet signals onto the cable system, to the various subscribers at their personal computers P. The personal computers P will in turn operate to send return signals back up the cable system to the Internet server.

In order to ensure that these return Internet signals on the coaxial system bypass the feed amplifiers and are maintained at an appropriate signal strength, return amplifiers indicated generally as 40 are provided at various locations, corresponding to the locations of the feed amplifiers along the cable system. The effect of these return amplifiers 40 is to accept the return signals generated at the various personal computers P of the individual subscribers, and to both amplify them and to equalize them to ensure that the signal strength of the return signals at the frequencies across the Internet bandwidth are maintained at appropriate signal strength levels, so that when they reach the Internet server 30 and go back onto the Internet via the cable 32, the return signals are at a level adequate to carry appropriate information back onto the Internet.

As already explained above, one of the problems in the design of such amplifiers is to ensure that they are effective to amplify the various different frequency signals up to a signal level which is equalized across the signal frequency band. As mentioned, in the case of the return amplifier, typically the return signal frequency band is as wide as from 5 to 42 mhz, so that the attenuation of signals across the frequency band can be a serious problem.

Figure 2:
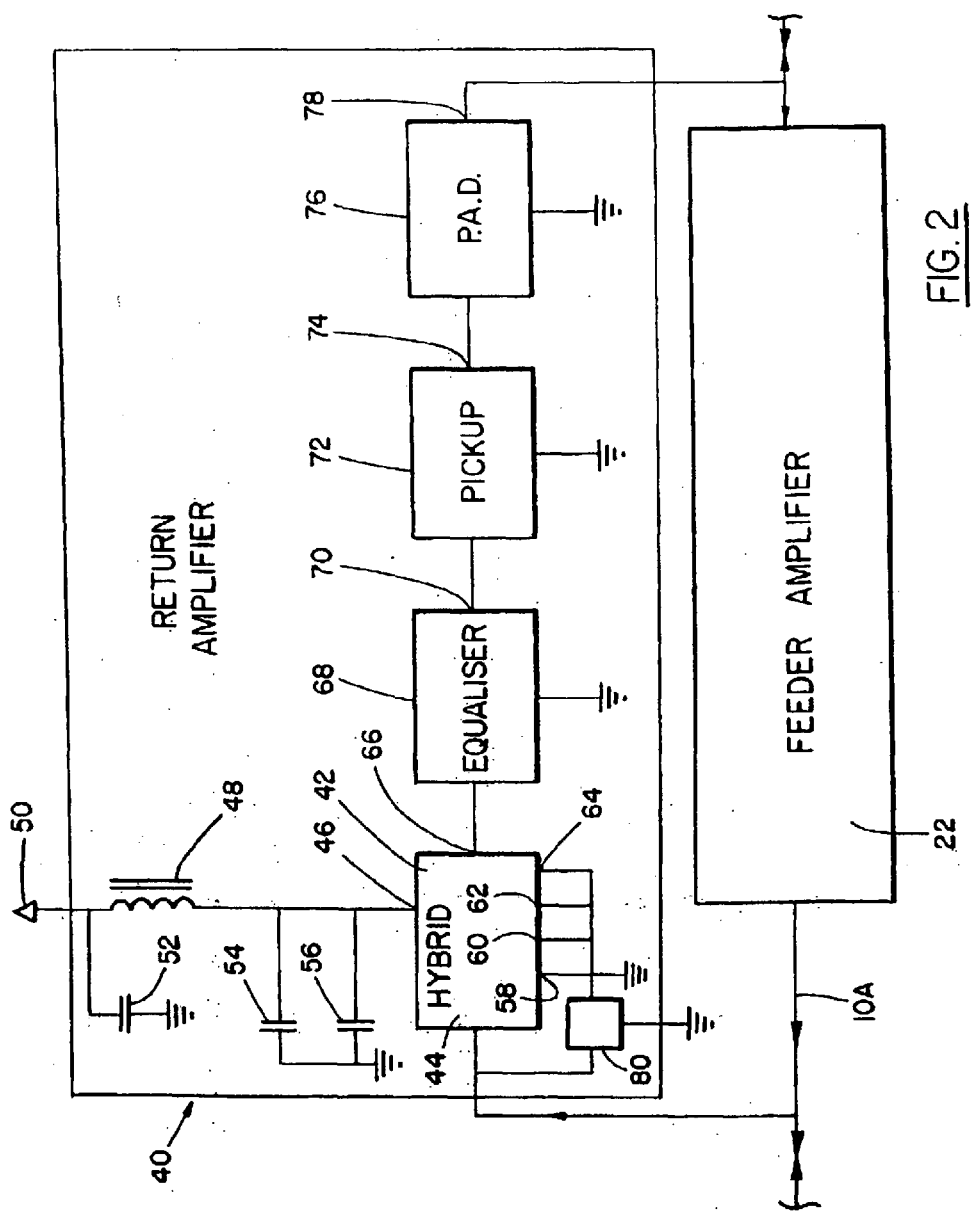
FIG. 2 is a block circuit diagram of a return amplifier illustrating the principles of the invention.
Figure 3:
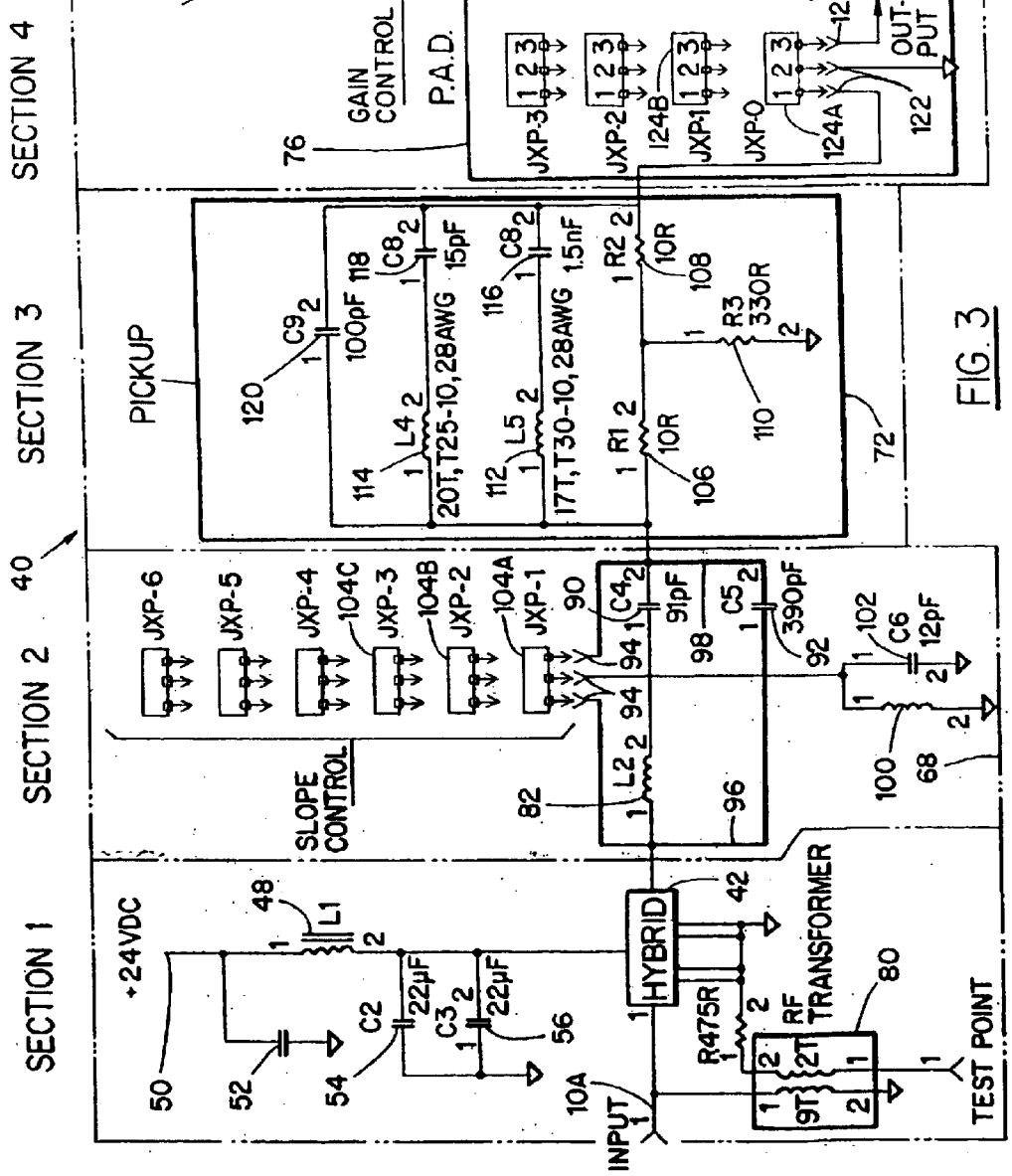
FIG. 3 is a detailed block circuit diagram of a return amplifier further illustrating the principles of the invention.

This amplification and equalization of the amplified return signal frequencies is achieved in the manner shown in FIGS. 2 and 3.

Referring now to FIG. 2, the return amplifier 40, which it will be noted is connected to cable 10 on the input and output ends of the feeder amplifier 22, comprises a gain block amplifier processor chip 42, having nine terminals. Terminal 44 is connected to the cable 10A downstream of feeder amplifier 22, so as to receive return signals flowing back along cable 10A from, for example, a personal computer P or other signal source, capable of sending return signals along the coaxial cable system 10. Terminal 46 is connected via a choke 48 to a power source 50. Capacitors 52, 54 and 56 are connected between the power source 50 and the gain block amplifier chip 42.

Terminals 58, 60, 62 and 64 of gain block amplifier chip 42 are connected to ground. Terminal 66 is connected, so as to pass signals from chip 42 to equalizer 68. Equalizer circuit 68 is in turn connected at connection 70 to Pick up circuit 72. Pick up 72 is in turn connected at connection 74 to plug in attenuator circuit 76. Plug in attenuator circuit 76 is in turn connected via connector 78 back to the cable 10, upstream of the feeder amplifier 22. In addition, the test point transformer 80 is connected between connections 58, 60, 62 and 64, and the input 1A. In this way return signals passing back up the cable system are amplified and equalized. Referring now to FIG. 3 the return amplifier 40 is shown in more detail.

As already explained, the return amplifier at its input end (left-hand end of FIG. 3), comprises a gain block amplifier 42 having nine terminals, and connected to a power supply 50, through choke 48, and capacitors 52, 54, and 56. A test point transformer 80 is also connected between the main input line 10A and the four lower terminals 58, 60, 62 and 64 of the gain block amplifier.

From the gain block amplifier 42, the return signals pass to the equalizer 68. The equalizer 68 comprises an inductor 82, and a capacitor 90 and a further capacitor 92.

There are three plug in terminals 94, 94, 94. The outer two terminals are connected via connections 96, 98, through capacitor 92 and then to ground through inductor 100 and capacitor 102.

The central terminal 94 is connected directly through to inductor 100 and capacitor 102.

There are a plurality of attenuator modules 104A, B, C, etc., each having three plug in pins, which are adapted to be received in the three plug in sockets 94. The attenuator modules each have different values, providing different levels of equalization. By selecting the appropriate attenuation module, the desired characteristics of the return amplifier 40 can be preset for the particular location in the cable system 10.

From the equalizer 68, the signal goes to the pick up circuit 72. The pick up circuit 72 comprises a three-way arrangement of resistors 106, 108 and 110, with resistor 110 being connected between resistors 106 and 108, and being connected to ground.

In parallel with resistors 106 and 108, there are provided a pair of inductors 112 and 114 each connected to respective capacitors 116 and 118. A third capacitor 120 is connected in parallel with the two inductor capacitor circuits.

From the pick up 72, the signals pass to a plug in attenuator circuit 76. This circuit simply consists of three plug receiving sockets 122, the centre socket being connected to ground.

FIG. 3 has been divided into four sections "1", "2", "3" and "4" and the following is a brief but concise description of the purpose and operation of each section.

Section "1"

The principal purpose of this section is to provide a flat linear gain across the band of interest in the frequency spectrum 5 to 42 Megahertz. Gain is accomplished through the use of a push-pull amplifier hybrid consisting of two single-ended transistor circuits working together so that one single-ended circuit amplifies only during the negative part of the cycle. Although this configuration requires two transistor circuits instead of one for every amplifier stage, it does reduce harmonic distortion significantly and thus can simultaneously amplify, with acceptable distortion, a larger number of signals than can one single-ended stage transistor working alone. The push-pull stages are then re-combined into a single output signal. The scheme of running push-pull circuits in parallel allows each stage to operate at a lower level and thus to produce less distortion for a given input and gain than one push-pull stage.

The +24VDC port derives voltage from a power supply external to the return amplifier but is part of the complete trunk or line extender station. Additional DC voltage filtering is accomplished by employing four additional components L1, C1, C2 and C3.

The hybrid is driven by analog or digital signals at the input port of the return amplifier and usually comes from local sources or further in the cable television system.

The test point port provides for the testing of input levels to the return amplifier.

This test port is well isolated from input, through the use of the RF transformer and R4 so that accurate input signal level readings can be made while not interfering with the main signal during the reverse amplifier operation.

Section "2"

The principal purpose of this section is to provide for a means of adjusting the output of the amplifier to compensate for cable characteristics through the use of a slope control.

Cable characteristics can be calculated by the simple formula of...

$$Cable\ Loss\ Ratio = \text{square root of } \frac{f1}{f2} \times \text{attenuation}$$

Where
- f1 unknown frequency
- f2 known frequency
- attenuation=known f2 frequency attenuation at a desired length.

Through the use of common inductive and capacitive circuits represented by L2 and C4 and C5 and L3 and C6 and a plurality of attenuators known as PADS the output of the return amplifier can be adjusted to emulate the cable characteristics. Three round pin sockets are provided on the printed circuit board to allow for the easy change of the PAD devices by either field technicians or bench technicians. PAD devices are available in one-half decibel steps to provide for greater versatility when very accurate system adjustments are demanded by the system design engineers. The drawing only shows one-decibel steps eg. JXP-1, JXP-2 etc. for the purpose of simplicity.

Section "3"

The main purpose of these circuits is to provide shaping of the frequency response at both 5 Megahertz and 42 Megahertz through the use of a pick up circuit. The need to provide a pick up at 5 Megahertz is make up for the roll-off in the frequency response inherent in the design and manufacture of the hybrid amplifiers produced primarily by the Motorola and Phillips corporations. The need to provide a pick up circuit at 42 Megahertz is to make up for the roll-off in the frequency response that is inherent in the design and manufacture of the diplex filter designs.

Section "4"

The main purpose of circuit is to provide a means of accepting plug in PADS to attenuate the output level or signal. This circuit is designed to adjust the amplifiers flat loss across the frequency band of interest 5 to 42 Megahertz. Three round pin sockets are provided on the printed circuit board to allow for the easy change out of the PAD devices by either field technicians or bench technicians. PAD devices are available in one-half decibel steps to provide for greater versatility when very accurate system adjustments are demanded by the system design engineers. Note that the drawing only shows one-decibel steps eg. JXP-1, JXP-2 etc. for the purpose of simplicity.

A plurality of plug in attenuator modules 124A, 124B etc. provided with suitable plug in pins are adapted to be plugged in to the sockets 122. In this way the performance characteristics of the entire return amplifier 40 can be set to the desired performance for the particular location in the cable network.

In accordance with a further embodiment of the invention, the invention also provides an equalizer for use in the feed amplifiers, for the purpose of replacing the existing equalizers in the existing feed amplifiers on the cable network.

As explained above, the objective of providing the improved equalizers in accordance with the invention, the purpose of equalizing the feed signals on the cable network, consisting both of the television signals and also the signals in the Internet band in the signal band width, typically from about 50 to 860 Megahertz.

Conventional feed amplifiers are already in place on existing cable networks for amplifying and equalizing signals over this signal wave band. The purpose of this embodiment of the invention is to optimize the signal equalization circuits in the feed amplifiers already on the cable network, so that the feed amplifiers as modified will then amplify all of the signals satisfactorily in the feed signal wave band, and equalize them to the same signal strength.

For this purpose, this embodiment of the invention is illustrated in more detail in FIGS. 4, 5 and 6. It will be seen to comprise a portion of a cable transmission network, comprising a typical transmission cable, having a feed end indicated generally as 200A and a downstream end indicated generally as 200B. The feed end 200 A is connected, typically through a diplex filter 202, which are well known in the cable transmission art. The diplex filter ensures that all feed signals, both Internet and television and other feed signals, are fed through the feed amplifier assembly indicated generally as 204, and are transmitted to a downstream diplex filter 206 where they are again fed onto the cable 200B.

Filter 206 also controls the return Internet signals and other return signals in the lower frequency range, ie. 5 to 42 Megahertz, and ensures that they are fed back through the return amplifier assembly 208, and are then reintroduced into the cable returning to the upstream or head end of the system through the cable.

The return amplifier 208 functions in the manner already described above, and requires no further description. However, the feed amplifier assembly indicated generally as 204, comprises an input PAD circuit 210, a feed signal equalizer 212, a feed signal amplifier 214, and optional controls 216. It will be appreciated that the construction of typical feed signal amplifier is somewhat different from the arrangement of the return signal amplifier already described, in that the arrangement of the equalizer and the amplifier is essentially reversed. However, this is the usual way in which existing feed amplifiers already in use are constructed, and accordingly this is used in this illustration for the purposes of simplicity. In any event, as explained above, the purpose of this embodiment of the invention is to provide a means of optimizing the equalization of the already existing feed amplifiers and not to completely replace them.

As already explained above, in this embodiment of the invention, the feed amplifier assembly 204 is modified by removing the existing signal equalizer circuit 212, present in the existing standard feed assembly amplifier assembly 204, by a new feed signal equalizer circuit 220, shown in more detail in FIGS. 5 and 6.

As shown in FIG. 5, the replacement feed equalizer circuit 220 comprises a capacitor 222, and first inductance 224 and a transformer 226. A plug-in PAD circuit 228 has first, second and third plug in connections P1, P2, and P3. Connection P1 is connected to the capacitor 222 and to the inductor 224.

Connection 2 is connected directly to the transformer 226.

Connection 3 of the PAD circuit 228 is connected to ground through a capacitor 230 and inductor 232.

In order to vary the equalization characteristics of the equalizer 220, a series of different plug-in attenuator components indicated generally as 234 (FIG. 6) are provided. These can be connected in place of the PAD or reactive circuit 228 by simple plug-in pin connections of a type well known and described above.

Thus in order to modify the feed amplifier on the existing cable transmission line, all that is required is for the lines person to remove the existing equalizer, in the existing feed amplifier and to replace it with an equalizer as shown in FIG. 6. The lines person then measures the signal strength at that point, and selects the most appropriate plug-in attenuator component, to produce a flat signal across the frequency band.

The equalizer circuit and the attenuator components are relatively light and small and do not occupy a great deal of space, and do not represent a great deal of mass or weight. Consequently, it is easy for the lines person to carry at least one equalizer and a supply of attenuator components up the pole, and to deal with the amplifier when he finds it, without having to climb up and down to the amplifier several times.

It will thus be seen that by use of the teaching of the invention, it is possible for a complete cable distribution network 10 to be modified and optimized to carry both signals used on the Internet system and the television signals and other signals which pass through the feed amplifiers 204 having modified equalizer circuits, on their way to the subscribers. The return signals in the lower wave band pass through the return amplifiers 208. In this way, the Internet server and other receivers when receiving return signals from the customers or subscribers will receive signals at an appropriately amplified level, with the signal strengths across the entire frequency range being equalized, so as to ensure satisfactory transfer of all information.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A feed amplifier signal equalization circuit for use with a plurality of feed amplifiers for two-way coaxial cable system having a distribution center distributing feed signals, a plurality of coaxial cable lines extending therefrom, and a plurality of tap ports connecting the feed signals from the plurality of coaxial cable lines to a plurality of terminals, the two-way coaxial cable system having reception facilities for receiving return signals from the two-way coaxial cable system, the feel signals and the return signals passing along the two-way coaxial cable system in opposite directions being progressively attenuated in signal strength, said two-way coaxial cable system having the plurality of feed amplifiers at spaced intervals therealong, for receiving the feed signals passing along the plurality of coaxial cable lines, and amplifying the same, the feed amplifier signal equalization circuit comprising:

a signal equalization circuit, said signal equalization circuit being connectable in one of the plurality of feed amplifiers for equalizing the signal strength of signals being across a wave band of the feed signals and having receptacles for receiving plug in circuit components for varying the characteristics of said signal equalization circuit;

a plurality of plug in attenuator components for said signal equalization circuit, each of said plurality of plug in attenuator components being of identical design, said plurality of plug in attenuator components being adapted to interfit with said signal equalization circuit interchangeably, and said plurality of plug in attenuator components having a range of varying performance characteristics whereby a respective plug in attenuator component of said plurality of plug in attenuator components can be selected and plugged into said signal equalization circuit to produce a performance specification desired for a first feed amplifier of the plurality of feed amplifiers at a predetermined location along the two-way coaxial cable system;

a return amplifier, said return amplifier being adapted to be connected to the two-way coaxial cable system around said first feed amplifier, whereby the feed signals can pass through said first feed amplifier in a feed direction, and the return signals can pass through said return amplifier around said first feed amplifier in a return direction, and wherein said return amplifier incorporates a return signal equalizer circuit, said return signal equalizer circuit adapted to receive one of a plurality of plug in attenuator components having characteristics which are predetermined, whereby said characteristics of said return amplifier can be adjusted by interchanging said plurality of plug in attenuator components in said return signal equalizer circuit, and wherein said return signal equalizer circuit incorporates PAD circuit receptacles being adapted to receive one of said plurality of plug-in attenuator components, and wherein said plug-in attenuator components for said feed signal equalization circuit, and for a return amplifier circuit are all of identical design, and are interchangeable between said feed signal equalization circuit and said return amplifier circuit and wherein said feed signal equalization circuit further comprises a PAD circuit receptacle, said PAD circuit receptacle having a first connection, a second connection, and a third connection, said first connection being connected to receive the feed signals, and to a capacitor and an inductance, said second connection being connected to a transformer resistor, and said third connection being connected to ground through a capacitor, an inductance, and to approximately a mid-point of a transformer.

2. A PAD circuit receptacle for use in a feed amplifier signal equalization circuit for use with a feed amplifier for a two way co-axial cable system comprising:

first, second, and third connections, said first connection for receiving feed signals, said first connection being connected to a capacitor and an inductance, said second connection being connected to a transformer resistor, said third connection being connected to ground through a capacitor and an inductance and to a mid-point of a transformer, wherein the PAD circuit receptacle provides for easy connection to the feed amplifier and return amplifier.

3. The PAD circuit receptacle of claim 2, further comprising said return amplifier connectable to the two way co-axial cable system around the feed amplifier, a plurality of feed signals passing through the feed amplifier in a feed direction, and a plurality of return signals passing through said return amplifier around the feed amplifier in a return direction.

4. The PAD circuit receptacle of claim 3, wherein return amplifier has said return signal equalizer circuit adapted to receive one of a plurality of plug in attenuator components, said plurality of plug in attenuator components having characteristics which are predetermined, and wherein the return amplifier can be adjusted by interchanging said plurality of plug in attenuator components in said return signal equalizer circuit.

5. The PAD circuit receptacle of claim 4, further comprising a return amplifier circuit, wherein said aplug in attenuator components are all of identical design and are interchangeable between said feed signal equalizer circuit and said return amplifier circuit.

6. An equalizer circuit for two-way co-axial cable systems, the equalizer circuit being adapted to receive one of a plurality of plug in attenuator components having predetermined characteristics comprising:

an equalizer, wherein said equalizer has characteristics that can be adjusted by interchanging one or more of said plurality of plug in attenuator components in the equalizer circuit, wherein said equalizer is a feed signal equalizer having a PAD circuit with a first connection, a second connection and a third connection, said first through third connections receiving feed signals, wherein said first connection is connected to a capacitor and an inductance, said second connection is connected to a transformer resistance, and said third connection is connected to ground though a capacitor and inductance, and to approximately a mid-point of said transformer, and wherein the PAD circuit provides easy connection to a feed amplifier and a return amplifier.

\* \* \* \* \*